INVENTOR.
DAVID V. CRONIN
ATTORNEY

Dec. 9, 1969 D. V. CRONIN 3,483,389
ELECTRO-OPTICAL ENCODER HAVING FIBER OPTIC COUPLING
Filed Jan. 23, 1968 2 Sheets-Sheet 2

INVENTOR.
DAVID V. CRONIN
BY
ATTORNEY

United States Patent Office 3,483,389
Patented Dec. 9, 1969

3,483,389
ELECTRO-OPTICAL ENCODER HAVING FIBER OPTIC COUPLING
David V. Cronin, West Peabody, Mass., assignor to Dynamics Research Corporation, Stoneham, Mass., a corporation of Massachusetts
Filed Jan. 23, 1968, Ser. No. 699,968
Int. Cl. G01b 11/00, 11/16
U.S. Cl. 250—219        7 Claims

ABSTRACT OF THE DISCLOSURE

An electro-optical encoder in which the light source and photodetectors are disposed remote from the encoder scale and interconnected therewith by fiber optic cables. One fiber optic cable couples the remote light source to a first portion of the scale, while a plurality of fiber optic cables couples a plurality of photodetectors to a second portion of the scale, the ends of the plurality of fiber optic cables confronting the second scale portion being configured to conform to the area of the scale rulings and being spatially interdisposed with respect to the rulings by a predetermined amount.

FIELD OF THE INVENTION

This invention relates to positional encoders and more particularly to electro-optical linear and rotary encoders.

BACKGROUND OF THE INVENTION

Positional encoders are well known for indicating the position of a movable element relative to a fixed element. For example, shaft encoders are widely used to indicate the angular position of a shaft with respect to a reference, and linear encoders are known for indicating the translational movement of an element with respect to a reference. In general, a precisely ruled scale is employed to provide an optical fringe pattern, the variations in light transmitted through the scale caused by the fringe pattern being detected by a photosensitive device which is operative to produce an electrical output signal which is then suitably processed to provide an indication of the scale position. Encoders of conventional design generally include, within a suitable housing, a light source positioned adjacent a ruled scale, one or more photosensitive cells also positioned adjacent the ruled scale in a position to sense the fringe pattern, and associated signal processing circuitry. However, for certain applications, this physical arrangement employed in conventional encoders is not suitable. For example, linear encoders are often employed in machine tools to indicate the precise position of a tool with respect to the bed of the machine. The encoder is often disposed within the machine structure in a location which is subject to dirt and vibration as well as being not easily accessible for purposes of adjustment, repair or replacement of components. Attempts have been made to solve the problems suffered by conventional encoders by locating the electronics associated with the encoder remote from the optical assembly, and interconnectin the asembly with the electronics by means of electrical cables. However, such attempts have not, in practice, been successful by reason of the attenuation suffered by the photocell signals in traveling through length of cable, and, further, by reason of electrical noise encountered by remotely located electronics. In accordance with the present invention, an encoder is provided wherein the ruled scale and optical assembly are located remote from the illumination source, photosensitive detector and associated electronics, the illumination source and the photodetectors being coupled to the scale by means of fiber optic or other light conductors.

SUMMARY OF THE INVENTION

Briefly, an encoder according to the invention includes a light source coupled to the ruled scale by means of a fiber optic or other light conductive cable having one end confronting the light source and the other end confronting a portion of the scale to be illuminated. A second plurality of fiber optic or other light conductive cables is employed to couple a second portion of the scale to the photosensitive detectors. One end of each of the plurality of fiber optic cables is disposed adjacent a second portion of the ruled scale where a fringe pattern is to be sensed, and the opposite end of each of the plurality of fiber optic cables is coupled to a photosensitive cell, the cells being connected to suitable signal processing circuitry to provide the intended output signals. The end of each of the plurality of fiber optic cables confronting the scale is configured to conform to the area of the rulings on the scale in order to receive a substantial portion of the light from the fringe pattern. The light source, the photosensitive cells and associated electronics can be located remotely from the scale and its associated optics. Thus, those element of the encoder system which are more susceptible to a contaminating environment or which should be accessible for adjustment repair or replacement, can be located in a controlled environment, while the optical head portion of the encoder can be mounted, for example, within the structure of a machine tool, in a rather inaccessible location.

Although fiber optic cables are preferable in the present invention by reason of their light transmitting efficiency and their mechanical flexibility, other light conducting devices such as Lucite rods can be employed.

BRIEF DESCRIPTION OF THE DRAWINGS

The invention will be more fully understood from the following detailed description, taken in conjunction with the accompanying drawings, in which.

DETAILED DESCRIPTION OF THE INVENTION

Figure 1:
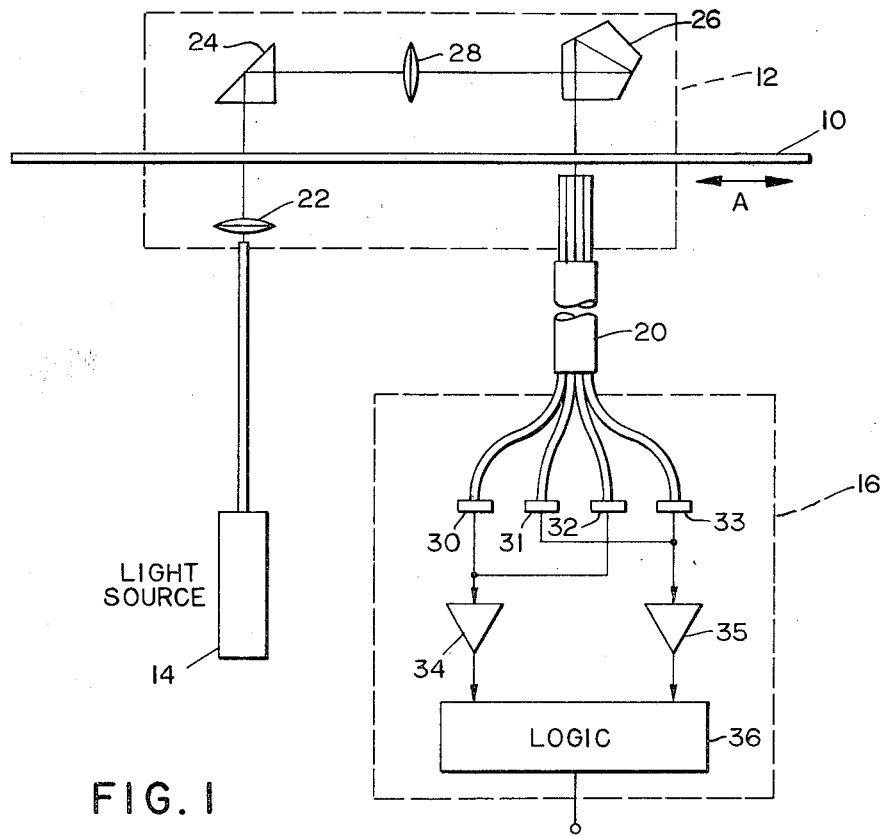
FIG. 1 is a diagrammatic view of an electro-optical encoder embodying the invention.

Referring to FIG. 1, there is shown a linear encoder including a ruled scale 10, an optical assembly 12, and an energy source 14 and detector assembly 16 which are located remote from the optical assembly 12 and coupled thereto by respective fiber optic cables 18 and 20. Scale 10 is fabricated from a suitable transparent material such as glass and has formed across the width thereof a plurality of alternate opaque and light transmissive sectors. Optical assembly 12 includes a collimating lens 22 located on one side of scale 10, a pair of prisms 24 and 26 disposed on the opposite side of scale 10, and a focusing lens 28 disposed between prisms 24 and 26. A fiber optic cable 18 has one end disposed in operative juxtaposition with lens 22 and its opposite end in operative association with light source 14. The plurality of fiber optic cables 20 is disposed with one end of each of the plurality of cables arranged in an array along the length of scale 10 with the opposite end of each of the plurality of cables in operative association with a respective photocell 30 through 33. Photocells 30 and 32 are interconnected in a back-to-back relationship, that is, in phase opposition, while photocells 31 and 33 are similarly interconnected in a back-to-back relationship. The output of photocells 30 and 32 is connected through amplifier 34 to logic circuitry 36, while the output from photocells 31 and 33 is connected to logic circuitry 36 via amplifier 35.

In operation, a light beam from light source 14 is propagated through fiber optic cable 18, through lens 22 and through a portion of scale 10 onto prism 24 which reflects the light beam parallel to scale 10 through lens 28 onto prism 26 which, in turn, doubly reflects the light through a second portion of scale 10 onto the ends of fiber optic cables 20. The operation of the encoder itself is well known and need not, therefore, be discussed at length herein except to the extent necessary for an understanding of the present invention. The detailed operation of the encoder is described, for example, in a copending application Ser. No. 699,969, filed Jan. 23, 1968, of Roger D. Foskett and Seymour N. Wasserman, entitled Linear Encoder, filed of even date herewith and assigned to the assignee of the present application. In brief, a magnified image of the rulings of scale 10 is projected by the optical elements onto the rulings on the second portion of scale 10. The superimposition of the scale rulings with the image of these rulings causes an optical fringe pattern to be produced which varies in a manner representative of the position of scale 10 with respect to a reference. Photosensors are placed along the length of the scale at positions with respect to the fringe pattern to produce out of phase electrical signals in response to light from the fringe pattern. The relative sense of the phase of these signals is representative of the direction of scale motion, while the number of cycles of these signals is representative of the amount of scale motion. The signals are processed by suitable circuitry, such as logic 36, which provides output signals of a form suitable to indicate the extent and sense of scale motion.

Figure 2:
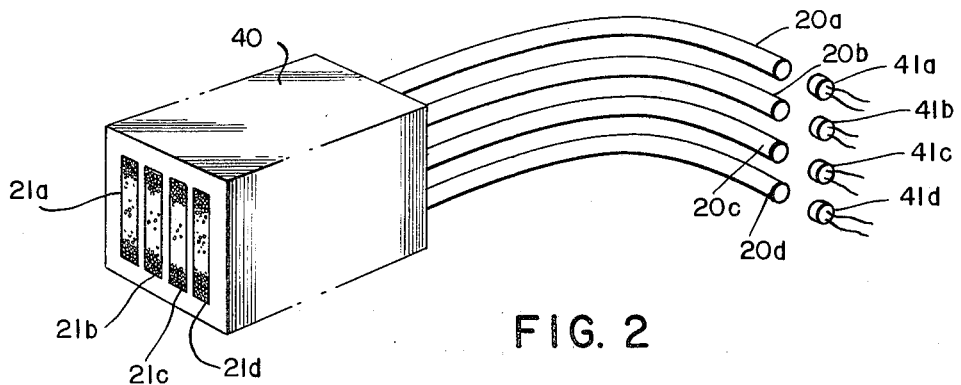
FIG. 2 is a greatly enlarged pictorial view of a fiber optic cable constructed according to the invention.

The ends of fiber optic cables 20 which confront scale 10 are configured to conform to the outline dimensions of the scale rulings so that the cables will receive essentially all the light transmitted through the rulings. Since each fiber optic cable consists of a great number of fibers, the cable end can be easily formed to a desired shape. Referring to FIG. 2, it is seen that the individual fiber optic cables 20a through 20d comprise an array of four rectangular end portions 21a through 21d. The end portions are each substantially the same dimensions as the scale rulings with which they are associated, and the respective end portions are spaced with respect to the scale rulings so that each end portion receives light from the fringe pattern which is spatially displaced from an adjacent portion by a predetermined amount. Typically, the fringe pattern is sensed at 90° spatial intervals to produce electrical signals 90° out of phase. In this instance, the end portions 21a through 21d are spaced along the fringe pattern at 90° spatial intervals to provide the requisite phase displaced light to the photocells. These rectangular end portions are embedded in a suitable encapsulating material 40, such as epoxy, so that the shape of the cable ends and the spacing between cable ends is accurately fixed. The optical pickup head so formed can be accurately positioned with respect to the ruled scale to sense the variable light at the requisite phase displaced positions of the fringe pattern. In order to maximize the light transmitted to the photocells, the opposite ends of cables 20a through 20d are also configured to conform to the shape of the active surface of the photocells with which they are associated. As illustrated in FIG. 2, the ends of cables 20a–20d remote from the ruled scale are circular in cross section and each end is in operative association with a respective photocell 41a through 41d. The photocells can be mounted directly on the cable ends, as illustrated in FIG. 3, or they can be otherwise disposed in light coupling relationship with the ends of the fiber optic cables, for example, via magnifying optics.

Figure 3:
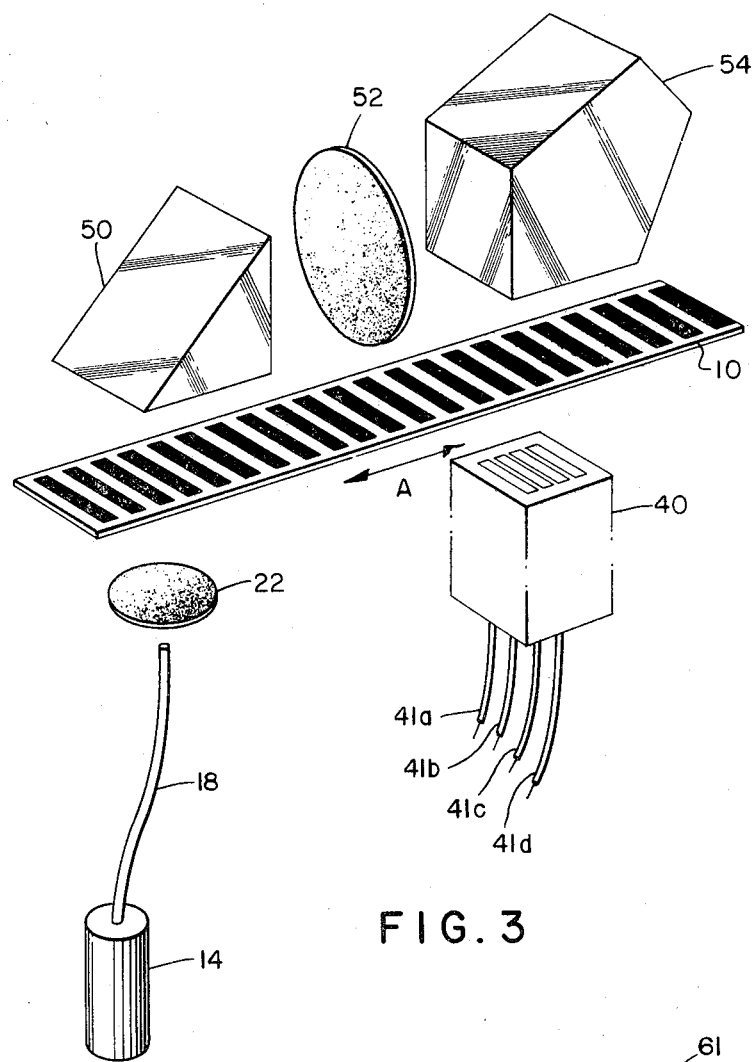
FIG. 3 is a diagrammatic pictorial view of a linear encoder constructed according to the invention.

The placement of the fiber optic assembly in conjunction with the optical head of the encoder is seen more clearly in FIG. 3. The optical assembly in this embodiment comprises a right angle prism 50, a focusing lens 52 and a doubly reflecting prism 54. A collimating lens 22 is located below scale 10 and is operative, in conjunction with the light source 14 and fiber optic cable 18, to illuminate a first portion of scale 10. The illuminated rulings on the first portion of scale 10 are projected by way of the optical assembly onto a second portion of scale 10 to produce the fringe pattern. Pickup head 40 is disposed beneath scale 10 with the rectangular end portions of the fiber optic cable in alignment with the scale rulings. Photocells 41a–41d are affixed in light receiving relationship with the opposite end of the fiber optic conductors, the outputs of the photocells being connected to suitable electronic circuitry (not shown) which provide output signals representing the magnitude and sense of scale movement. As discussed hereinabove, the pickup head 40 is disposed with respect to the scale rulings such that the rectangular end portions of head 40 are juxtaposed relative to the optical fringe pattern produced by the encoder operation to sense predetermined out of phase portions thereof.

Figure 4:
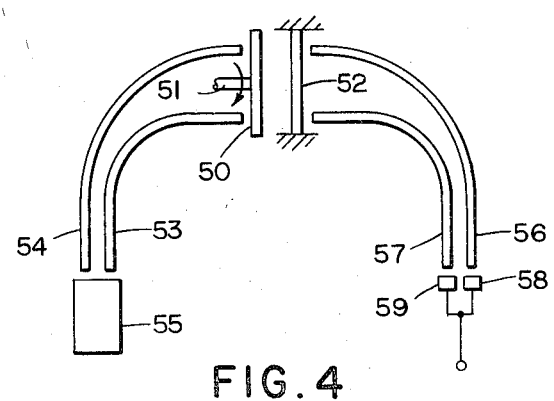
FIG. 4 is a schematic view of a rotary encoder embodying the invention.

The invention can also be embodied in a rotary encoder as seen in FIG. 4. A ruled disc 50 is rotatably mounted on a shaft 51 and confronts a stationary ruled disc 52, the two discs cooperating in a well known manner to produce the intended fringe pattern. A first pair of fiber optic cables 53 and 54 are arranged with respect to disc 50, with their ends diametrically disposed in light transmitting relationship with the rulings on disc 50. The opposite ends of cables 53 and 54 confront a light source 55. A second pair of fiber optic cables 56 and 57 are arranged with respect to disc 52 with their ends diametrically disposed to receive light transmitted through both discs by cables 53 and 54. The other ends of cables 56 and 57 are coupled to respective photocells 58 and 59, which are interconnected to provide an output signal representation of the rotational position of disc 50 to disc 52.

Figure 5:
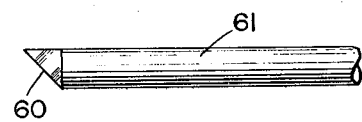

To most effectively couple light to or from a fiber optic cable, the cable end should be disposed normal to the element to which it is coupled. As is evident from FIGS. 1, 3, and 4, the fiber optic cables are disposed normal to their associated rulings, light sources and photocells. Such fiber optic cables have a minimum bending radius below which the cables cannot be bent without damage to the fibers. In some instances this bending radius limitation may not allow the most suitable mechanical packaging of the encoder. According to a further feature of the invention, the fiber optic cables can be oriented parallel to the components with which they are associated. Referring to FIG. 5, a right angle prism 60 is affixed to the end of fiber optic cable 61 such that light propagating through the cable toward the prism is reflected 90° and emerges from the cable orthogonal thereto. And of course, a light beam orthogonal to cable 61 which impinges upon prism 60 is similarly reflected into the cable. Thus, the cable ends employing such prismatic means can be disposed parallel to the ruled scale to allow compact packaging of the optical head. Similarly, the cable ends associated with the light source and the photocells can be arranged parallel to these components, as the situation may require, by use of the prismatic means.

I claim:
1. An electro-optical encoder comprising:
 a scale having a plurality of alternately light transmissive and opaque sectors thereon and adapted for movement with respect to a reference;
 a light source disposed remote from said scale;
 a plurality of photosensitive devices disposed remote from said scale and operative to produce signals respentative of the extent and direction of scale movement;
 a fiber optic cable having one end in operative association with said light source and the other end in juxtaposition with and operative to illuminate a first portion of said scale;

optical means for providing at a second portion of said scale a fringe pattern which varies in a manner related to and representative of the movement and direction of said scale; and a plurality of fiber optic cables each having a first end of substantially the same area and shape as the light transmissive sectors being viewed and each spaced from the other by an amount such that said first ends are in predetermined spatial relationship with said sectors, said first ends being disposed in operative juxtaposition with said second portion of said scale along a dimension transverse of said sectors and in alignment with said sectors, each cable of said plurality having a second end remote from said scale and in effective light coupling relationship with a respective photosensitive device.

2. The encoder according to claim 1 wherein the second ends of said plurality of fiber optic cables are configured to substantially conform to the shape of respective photosensitive devices associated therewith.

3. The encoder according to claim 1 wherein the first ends of said fiber optic cables are maintained in spaced relationship by an encapsulating material surrounding said cables.

4. The encoder according to claim 1 wherein said scale is linear and said sectors are rectangular and are disposed in substantially parallel relationship acorss the width thereof.

5. The encoder according to claim 1 wherein said scale is circular and said sectors are disposed radially on a surface of said scale.

6. The encoder according to claim 1 wherein the first ends of said fiber optic cables are spaced at 90° spatial intervals along the fringe pattern, and said photosensitive devices produce electrical signals 90° out of phase respective of the extent and direction of scale movement.

7. The encoder according to claim 4 wherein said other end of said fiber optic cable is disposed on one side of said scale confronting a first portion thereof, said first ends of said plurality of fiber optic cables being disposed on said one side of said scale confronting a second portion thereof, and said optical means includes an optical system disposed on the opposite side of said scale and operative to project an image of the scale sectors at said first portion onto the scale sectors at said second portion in a spatial disposition to provide a fringe pattern.

References Cited

UNITED STATES PATENTS 3,244,895   4/1966   Anderegg _____ 88—14
3,384,755   5/1968   Williamson et al. ____ 250—227

RALPH G. NILSON, Primary Examiner

C. M. LEEDOM, Assistant Examiner

U.S. Cl. X.R.

250—227, 231; 350—96; 356—222